United States Patent Office 2,876,228
Patented Mar. 3, 1959

2,876,228

RECOVERY OF RESCINNAMINE

Harold W. Ordway, New York, N. Y., and Peter A. Guercio, New London, Conn., assignors to Chas. Pfizer & Co., Inc., New York, N. Y., a corporation of Delaware No Drawing. Application November 27, 1956
Serial No. 624,493

7 Claims. (Cl. 260—287)

This invention is concerned with a new and useful process for the recovery of rescinnamine. More particularly it is concerned with the process by which rescinnamine can be isolated from substantial amounts of naturally occurring alkaloidal and non-alkaloidal impurities and the degradation products thereof.

Rescinnamine is a member of the class of Rauwolfian alkaloids present in plants of the species *Rauwolfia serpentina* and *Rauwolfia vomitoria* as well as other plants of the Rauwolfian genus. Its use as a hypotensive agent has been fully described in the chemical and medical literature.

It has now unexpectedly been discovered that rescinnamine can be recovered in the form of a rescinnamine-benzene solvate from benzene solutions containing it together with substantial amounts of other naturally occurring alkaloidal and non-alkaloidal impurities. These impurities include reserpine rauvomitine as well as various naturally occurring fats and waxes and unidentified degradation products thereof.

In one of the procedures which is particularly useful for the isolation of reserpine, ground roots of plants of the genus Rauwolfia are extracted with methyl alcohol which may be either cold or hot. The solution is concentrated to a solids content of between 5 and 50% and diluted with 2 to 5 volumes of 5 to 25% aqueous acetic acid. The fats which precipitate can be removed by filtration and the filtrate extracted with hexane to remove additional impurities. The filtrate is then extracted with benzene whereupon a benzene solution containing reserpine, rescinnamine and substantial quantities of other materials both alkaloidal and non-alkaloidal as indicated above is obtained. The benzene solution is neutralized with a basic reagent, concentrated to a small volume, or in some cases, to dryness and taken up in 5 to 50 parts of a lower alkanol containing up to four carbon atoms. The preferred alkanol is methanol. The solution is then seeded with reserpine crystals and the reserpine which precipitates is collected by filtration.

The solids content remaining dissolved in the lower alkanol may contain as little as 5% of rescinnamine. In other words, up to 95% of the total solids content in the alkanol solution may be non-rescinnamine matter. The process of this invention makes it possible to recover rescinnamine of good quality from this highly impure mixture.

It is a most startling discovery to find that the use of benzene makes possible the separation of rescinnamine of good quality from the solids content described above. It is particularly startling in view of the fact that other and similar solvents such as toluene, ethyl benzene, xylene, hexane, petroleum ether and ligroin cannot be utilized for this separation. When any of these solvents are used either nothing at all crystallizes from solution or a very impure rescinnamine is recovered.

In practicing the instant invention the solids content of the lower alkanol filtrate obtained during the recovery of rescinnamine is taken up in a benzene solution to obtain a solution having a solids content of from 5 to 40% by weight. One method of accomplishing this is simple evaporation of the alkanol solution to give a dry residue which is taken up in the appropriate quantity of benzene. The same effect can also be accomplished by adding benzene to the alkanol solution while distilling off the alkanol together with appreciable quantities of benzene. In a preferred method this distillation is carried out at room temperature at a pressure of about 10 to 20 mm. of mercury. The distillation can, however, be carried out at any convenient temperature and pressure up to the boiling point of the mixture at atmospheric pressure. Employment of lower temperatures, however, decreases losses due to decomposition.

Another method of preparing a benzene solution having a solids content of from 5 to 40% by weight is to precipitate the solids content by adding the lower alkanol solution to dilute aqueous mineral acid. Hydrochloric and phosphoric acids are the preferred precipitating agents because they seem to precipitate a higher percentage of the total solids than do other mineral acids. The precipitate is then taken up in a mixture of benzene and water and the pH of the aqueous layer adjusted to the basic side of neutrality, preferably about 10.5 whereupon the organic content of the original precipitate is extracted into the benzene layer.

Although the process of the instant invention may be effectually carried out if the solids content of the benzene solution is between 5% and 40% by weight, it is preferred to operate in solutions between 15% and 25% solids concentration. This is because with the more dilute solution the volume of the solvent may be so large as to be difficult to handle while with the more concentrated solutions the quality of rescinnamine recovered will be somewhat impaired. Furthermore, as described more fully hereinafter, the quantity of rescinnamine lost in the acid wash is increased unnecessarily outside of this preferred range.

Rescinnamine can be separated from the benzene solution by simply allowing said solution to stand at room temperature, that is, about 25 to 30° C. Precipitation can be hastened if the solution is cooled to say about 0° C. Precipitation, therefore, takes place at a room temperature of from about 0° C. to about 30° C.

The rescinnamine which precipitates from benzene solution contains one molecule of benzene solvate with each molecule of rescinnamine. A substantially pure rescinnamine can be recovered from this solvate by a number of methods. It can be recovered, for example, by digesting the solvate with a lower alkanol containing up to three carbon atoms. It can also be recovered by dissolving the solvate in a solvent such as acetone from which it can be precipitated by the addition of water. Alternatively, it can be dissolved in ethyl acetate and precipitated by the addition of hexane. Another convenient method of decomposing the solvate is to dry at an elevated temperature, say about 70 to 90°, at a pressure of about 0.1 mm. of mercury for a period of from one to two hours.

The quality of the rescinnamine recovered is improved if the benzene solution is washed one or more times with from 1 to 3 volumes of an aqueous solution containing from 1% to 15% of a lower alkanoic organic acid containing up to three carbon atoms. Optimum yields are obtained utilizing about 10% aqueous acetic acid as the acid wash.

The purpose of the acid wash is to increase the rescinnamine content of the total solids. This is accomplished in two ways. Certain of the impurities, as well as small quantities of rescinnamine, are extracted into the aqueous acetic acid solution. Other impurities, as well as small quantities of the rescinnamine, are precipitated as a resinous gummy mass from which the benzene solution containing remaining recoverable rescinnamine is readily freed. In a typical run using acetic acid the rescinnamine content of the total solids is increased by about 15% to about 30%. If an acid wash is employed it is best not to use a benzene solution of too high a concentration otherwise an unnecessary amount of rescinnamine may be lost either by dissolving in the aqueous acid or by precipitating in the gummy mass.

After the benzene solution has been freed from the aqueous acid and from the gummy precipitate, it is neutralized with an aqueous alkaline reagent. Ammonium hydroxide is preferred for this neutralization step, although any of the commonly employed water soluble alkali or alkaline earth metal oxides, hydroxides, carbonates and bicarbonates can be employed. These alkaline reagents include, for example, potassium hydroxide, sodium hydroxide, sodium carbonate, sodium bicarbonate, lithium hydroxide, calcium hydroxide, barium hydroxide and others.

The rescinnamine-benzene solvate is generally recovered from the alkali washed benzene layer by allowing the benzene solution to stand at from 0° to 30° C. so as to precipitate rescinnamine which can be separated by filtration.

The crystallization process can be hastened by seeding the benzene solution containing rescinnamine with a few crystals of rescinnamine.

The rescinnamine which is recovered using the process of the present invention is generally between 70 and 90% pure.

The following examples are given for the purpose of illustration only and are not to be construed as limitations of this invention, many apparent variations of which are possible without departing from the spirit or scope thereof.

*Example I*

A 500 ml. methanol filtrate from the recovery of reserpine which contained 9.6 g. of reserpine, 21.6 g. of rescinnamine and 120 g. of total solids was placed in a distillation flask and the methanol removed by distillation at 10 to 20 mm. of mercury at room temperature. The initial volume of the methanol solution was maintained constant during the distillation by the continuous addition of benzene. The methanol was substantially removed after about 2500 ml. of benzene had been added. The mixture so obtained was diluted to a total volume of 1 liter with fresh benzene. The benzene solution was washed twice with one liter portions of 10% aqueous acetic acid solution. Considerable gumming occurred during this operation. The benzene layer was separated from the aqueous acetic acid layer. It was washed with 300 ml. of 1.7 N ammonium hydroxide and concentrated to a solids content of about 25%. It was seeded with rescinnamine and cooled to about 6° C. for three hours. The resulting slurry was diluted with fresh benzene to facilitate the filtration and filtered. A second crop of rescinnamine-benzene solvate was obtained by concentrating the filtrate to a total volume of about 270 ml. and again cooling and filtering. The combined precipitates were dried at 80°/0.05 mm. for one hour.

The overall yield of rescinnamine was about 75% of the total rescinnamine in the original methanol filtrate. Its purity was better than 90%.

*Example II*

A 3400 ml. methanol solution obtained from the recovery of reserpine and containing about 30% by weight of total solids was placed in a distillation flask and the methanol replaced with benzene as described above. The benzene solution so obtained was diluted to 6800 ml. by the addition of fresh benzene, washed twice with 6800 ml. portions of 10% acetic acid and the benzene layer separated from aqueous acetic acid and gummy precipitate. It was washed with 1.7 l. of water containing 700 ml. of concentrated ammonium hydroxide. The benzene solution was concentrated to a solids content of about 25%, seeded with rescinnamine and stirred at room temperature for one-half hour. The slurry which was obtained was filtered and the precipitated rescinnamine-benzene solvate washed with cold benzene. The precipitate was then dried for one hour at 0.1 mm. of mercury at 80° C.

A second crop of rescinnamine-benzene solvate was recovered by concentrating the filtrate. The solvate was decomposed by drying at 80° C./0.1 mm. for one hour. The total yield of rescinnamine recovered was about 65% and the purity was 90 to 95%.

*Example III*

A 300 ml. ethanol solution obtained from the recovery of reserpine and containing about 30% by weight of total solids was placed in a distillation flask and the ethanol replaced with benzene as described above. The solution was diluted to a total volume of 225 ml., seeded with rescinnamine crystals and kept at about 5° for five days. The rescinnamine-benzene solvate which precipitated was recovered by filtration and the precipitate washed with cold benzene. The precipitate was dried at 0.1 mm. of mercury at 80 to 85° C. for one hour. The total yield of rescinnamine was about 55% and the purity about 70%.

*Example IV*

A 600 ml. ethanol solution obtained from the recovery of reserpine containing about 30% by weight of total solids was placed in a distillation flask and the ethanol removed by distillation at atmospheric pressure. The initial volume of the ethanol solution was maintained constant during the distillation by the continuous addition of benzene. The solution was concentrated to a total volume of 550 ml., seeded with rescinnamine crystals and kept at about 5° C. for five days. The rescinnamine-benzene solvate which precipitated was recovered by filtration and washed with cold benzene. It was decomposed by heating in vacuo at 80 to 85° C. and 01. mm. of mercury for one hour. The total yield of rescinnamine was about 50% and the purity about 70%.

*Example V*

A 1500 ml. propanol solution obtained from the recovery of reserpine containing about 30% by weight of total solids was evaporated to dryness and the residue taken up in 3 l. of benzene. The benzene solution was washed twice with 3 l. portions of 10% propionic acid and the benzene layer separated from aqueous propionic acid and gummy precipitate. It was washed with 800 ml. of an aqueous solution containing 300 ml. of concentrated ammonium hydroxide. The washed benzene layer was cooled to 5° C. and maintained at that temperature for four days. The rescinnamine-benzene solvate which precipitated was filtered and the precipitate washed with cold benzene. It was dried for one hour at 0.05 mm. of mercury at 75° C. The total yield of rescinnamine recovered was about 50% and the purity about 75%.

*Example VI*

An ethanol solution from the recovery of reserpine was added to dilute phosphoric acid aqueous solution and the precipitate recovered by filtration. The wet precipitate containing about 30% water had a total weight of 525 lbs. It was slurried with 150 gals. of benzene and the aqueous layer adjusted to pH 10.5 with 2% aqueous sodium hydroxide. The benzene layer was then separated and the aqueous layer slurried two more times with 150 gal. portions of benzene. The combined benzene extracts were washed twice with 150 gal. portions of 5% aqueous acetic acid, once with 150 gals. of water containing sufficient ammonium hydroxide to give a final aqueous pH of 8.0, and finally with an additional 150 gals. of water. The benzene layer was clarified with Supercel, concentrated to a total volume of 30 gals., seeded with rescinnamine and stirred for two days at room temperature. The resulting slurry was filtered and filter cake washed with cold benzene. The precipitate was digested with 40 gals. of methanol, filtered and the precipitate dried at 60°/20 mm. for two hours. The total yield of rescinnamine recovered was about 80% and the purity about 90%.

*Example VII*

A 1200 ml. ethanol solution obtained from the recovery of reserpine containing about 30% by weight of total solids was placed in a distillation flask and the ethanol removed by distillation in vacuo. The residue was taken up in 400 ml. of benzene. The benzene solution was seeded with rescinnamine crystals and kept at 0° C. for three days. The rescinnamine-benzene solvate which precipitated was recovered from filtration and washed with cold benzene. It was digested with 300 ml. ethanol for one hour and the pure rescinnamine recovered by filtration. The total yield of rescinnamine was about 50% and the purity about 70%.

What is claimed is:

1. The process for recovering rescinnamine from the lower alkanol mother liquid remaining after crystallization of reserpine therefrom which comprises the steps of taking up the solids content of said mother liquid in a benzene solvent to obtain a solution containing from 5 to 40% solids by weight, precipitating rescinnamine-benzene solvate from said solution, and separating said solvate from said solution.

2. The process of claim 1 wherein the solids content is taken up by evaporating lower alkanol from said lower alkanol mother liquid and contacting resulting solids with benzene.

3. The process of claim 1 wherein the solids content is taken up by distilling off the lower alkanol while adding benzene at a rate sufficient to maintain a constant liquid volume.

4. The process of claim 1 wherein the solids content of the lower alkanol mother liquor is taken up by the steps of adding a dilute aqueous mineral acid solution to said lower alkanol mother liquor separating resulting precipitate, and dissolving separated precipitate in benzene at a pH greater than 7.

5. The process of claim 1 including the steps of decomposing separated rescinnamine-benzene solvate and recovering resulting rescinnamine.

6. The process of claim 1 including the steps of washing the benzene solution containing from 5 to 40% solids by weight at least once with aqueous 1 to 15% lower alkanoic acid containing up to 3 carbon atoms, separating resulting aqueous and benzene-containing phases, and washing the resulting separated benzene phase with an alkaline reagent prior to precipitating rescinnamine-benzene solvate therefrom.

7. The process of claim 1 wherein the rescinnamine-benzene solvate is precipitated at a temperature of from 0 to 30° C.

References Cited in the file of this patent

FOREIGN PATENTS 759,314      Great Britain _____ Oct. 17, 1956

OTHER REFERENCES

Djerassi et al.: vol. 76, J. A. C. S., pp. 4463–5 (1954).
Poisson et al.: Compt. Rend., vol. 238, 1954, pp. 1607–9.